US005486393A

United States Patent [19]

Wiklund

[11] Patent Number: 5,486,393

[45] Date of Patent: Jan. 23, 1996

[54] METHOD OF MANUFACTURING SHEET ELEMENTS OF END-WOOD TYPE AND ELEMENT MANUFACTURED THEREBY

[76] Inventor: Martin Wiklund, Mosstorpsvägen 40, S-183 30 Täby, Sweden

[21] Appl. No.: 244,029

[22] PCT Filed: Oct. 29, 1993

[86] PCT No.: PCT/SE93/00902

§ 371 Date: May 16, 1994

§ 102(e) Date: May 16, 1994

[87] PCT Pub. No.: WO94/09955

PCT Pub. Date: May 11, 1994

[30] Foreign Application Priority Data

Nov. 4, 1992 [SE] Sweden ................................ 9203292

[51] Int. Cl.[6] ................................ B32B 3/14; B27D 1/00

[52] U.S. Cl. ........................... 428/58; 144/346; 144/350; 156/264; 156/304.5; 428/106

[58] Field of Search ................................ 52/575, 745.19; 144/345, 346, 355, 350; 156/159, 250, 264, 304.1, 304.5; 428/58, 106, 80, 98, 528, 535, 537.5

[56] References Cited

U.S. PATENT DOCUMENTS

| | | | |
|---|---|---|---|
| 301,068 | 6/1884 | Parmelee | 144/350 |
| 947,001 | 1/1910 | Kertscher | 144/350 |
| 2,544,935 | 3/1951 | Orner | 144/350 |
| 3,961,654 | 6/1976 | Hasenwinkle | 144/350 |
| 3,969,558 | 7/1976 | Sadashige | 144/350 |
| 3,989,078 | 11/1976 | Hasenwinkle | 144/350 |
| 4,111,247 | 9/1978 | Hasenwinkle | 144/350 |
| 4,122,878 | 10/1978 | Kohn | 144/350 |
| 4,897,140 | 1/1990 | Opsvik | 144/350 |

FOREIGN PATENT DOCUMENTS

| | | | |
|---|---|---|---|
| 567886 | 6/1958 | Belgium | 144/346 |
| 524031 | 4/1931 | Germany . | |
| WO89/04747 | 6/1989 | WIPO . | |

*Primary Examiner*—W. Donald Bray

*Attorney, Agent, or Firm*—Burns, Doane, Swecker & Mathis

[57] ABSTRACT

The invention relates to a method of manufacturing sheet elements of end-wood type for use as wear surfaces for floors, tables or the like. According to the invention a longitudinally sawn piece of wood (10) is sawn up with cuts oblique to the longitudinal direction into plates of larger area than the cross-sectional area of the piece of wood. Thereafter the plates (12) are laid next to each other and joined together by complementarily shaped edge surfaces to form a sheet end-wood element. The invention also relates to a sheet element made in accordance with the above described method.

13 Claims, 2 Drawing Sheets

A
A–A
10
12
12'
12a'
12b'
12c'
14
14'
16'

METHOD OF MANUFACTURING SHEET ELEMENTS OF END-WOOD TYPE AND ELEMENT MANUFACTURED THEREBY

The present invention relates to a method of manufacturing sheet elements of end-wood type for use as wear surfaces for flooring, counters and the like.

For many many years it has been known to manufacture floor surfaces made up of end-wood pieces in the form of relatively short wood blocks, which can consist of cut-off posts with essentially circular end surfaces or cut-off sawn planks or pieces of lumber with preferably rectangular cross-sectional areas. Such floor surfaces of blocks have a number of advantages. Inter alia, they are very wear-resistant and pleasant to walk on as well as being aesthetically pleasing. For outdoor purposes, impregnated woodblocks of round cross-section are often laid in sand, asphalt or other filler material, which can absorb the natural moisture-induced movements in the wood. For indoor environments, depending on the use, blocks of primarily rectangular cross-sectional shape have been glued together into composite blocks or sheets which are later sawn and sanded into either self-supporting massive block floor-boards or a relatively thin wear-layer for block ply floor-boards, which are tongued and grooved to facilitate laying the boards to make a floor.

In the corresponding manner counters and tables can be made of blocks of rectangular cross-section.

Despite the fact that such end-wood products have often been greatly appreciated due to their wear-resistance and pleasant appearance, they have never come into widespread use due to their tendency to crack or be deformed with changes in moisture. Cracking is due primarily to the fact that the movement of moisture in the wood varies in different directions, i.e. it is about twice as great in the tangential direction of the growth rings as it is radially to the growth rings, so that the internal stresses in the wood will become excessive.

One method of substantially dealing with this problem has been to stabilize the dimensions of the wood with the aid of various chemicals. This is, however, expensive and often unacceptable for environmental reasons.

Another method of reducing the risk of cracking is to saw out pieces of wood with triangular cross-section and glue them together into a composite block, which is in turn sawn up transversely to the fiber direction into sheets or stave or board-like products (see e.g. SE-A-9100830-0). If, when gluing together the sawn-out pieces of wood — regardless of whether these are triangular or of other shape, e.g. rectangular, in cross-section — the growth ring direction is oriented in a uniform manner, it is possible to obtain an end-wood product, the moisture movements (and thus the internal stresses) of which will be regular and predictable. However, in this case as well, the movements tangentially to the growth rings can be so great as to cause problems.

The primary purpose of the present invention is to suggest an improved process főr manufacturing sheet elements of end-wood type, with which it is possible to obtain end-wood elements with substantially reduced moisture movement in the plane of the wear surface, especially reduced moisture movement tangentially to the growth rings.

According to the invention, this is achieved by virtue of the fact that a longitudinally sawn piece of wood, preferably of triangular or square cross-section, is sawn up with parallel cuts oblique to the longitudinal direction, into plates the cut area of which is greater than the cross-sectional area of the piece of wood, whereafter the plates are laid next to each other and joined together with complementarily shaped edge surfaces to form a sheet end-wood element. This means that the dominant tangential movement of moisture can be given a component which is directed perpendicularly to the plane of the wear surface, and this results in a substantial reduction in the moisture movement in the plane of the wear surface.

Suitably the longitudinally sawn piece of wood is sawn up with oblique cuts within an angular range of about 30–75° to a plane normal to the longitudinal axis of the piece of wood, and the angle is selected for the type of wood in question so that the sawn-out plates will have an essentially uniform moisture movement in all directions in the surface plane of the plates.

The present invention also encompasses the sheet element of end-wood type made according to the present method for use as a wear surface for floors, counters, tables and the like. The sheet element according to the invention is particularly characterized in that it is made of obliquely sawn-out plates, preferably of triangular or square cross-section, from longitudinally sawn pieces of wood, said plates being joined together with complementarily shaped edge surfaces to form the sheet end-wood element. The sawn-out plates can be laid together and joined together in different end-wood patterns to produce sheet elements with reduced and controlled moisture movements in all directions in the plane of the wear surface, thus substantially reducing the risk of cracking.

In one embodiment of the element according to the invention it can be made of relatively thick plates to form a self-supporting, massive sheet of end-wood type, e.g. a table top, or the element can be made of relatively thin plates to form a relatively thin wear layer of end-wood type, which can be glued to a support such as fiber-board, plywood, core-board or the like for use as floor-boards with a wear layer of end-wood type.

In addition to reducing the movement of moisture in the plane of the wear surface, i.e. primarily in the direction where the movement of moisture is critical to the product, the invention has the advantage of providing greater freedom to compose attractive patterns for the wear surface of the product, and the individual pieces of wood in the surface of the product can be made larger, which is often preferable both as regards manufacturing efficiency and appearance. Furthermore, it is easier to work a wood surface which has been cut obliquely to the fibers, and it provides a better final finish and there is less risk of pick-ups than with pieces cut perpendicularly to the direction of the fibers.

The invention will be described in more detail below with reference to the accompanying drawings, where:

Figure 1:
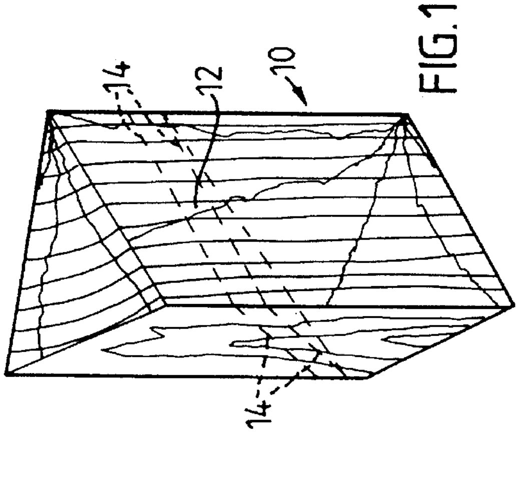
FIG. 1 is a perspective view of a portion of a longitudinally sawn piece of wood with a triangular cross-section, in which the dashed lines show the cut lines for an obliquely cut plate of end-wood character.

FIG. 1 shows an example of a longitudinally sawn piece of wood 10 of triangular cross-section from which a plurality of plates 12 of end-wood character are to be sawn in accordance with the present inventive idea. Although the piece of wood 10 in FIG. 1 is shown with triangular cross-section, it should be understood that other cross-sectional shapes are also conceivable, such as rectangular or another suitable polygonal shape. Furthermore, it is possible to have the longitudinally sawn piece of wood in itself be composed of pre-bonded pieces of a block with the desired growth ring orientation of the individual pieces. The expression "piece of wood" in the present specification and claims should thus encompass both ordinary longitudinally sawn pieces of wood as well as composite blocks thereof. The longitudinally sawn pieces of wood should however be sawn out to one side of the pith and should preferably lack juvenile wood, since these portions of the stem often give rise to internal tensions and thus cracking.

Figure 2:
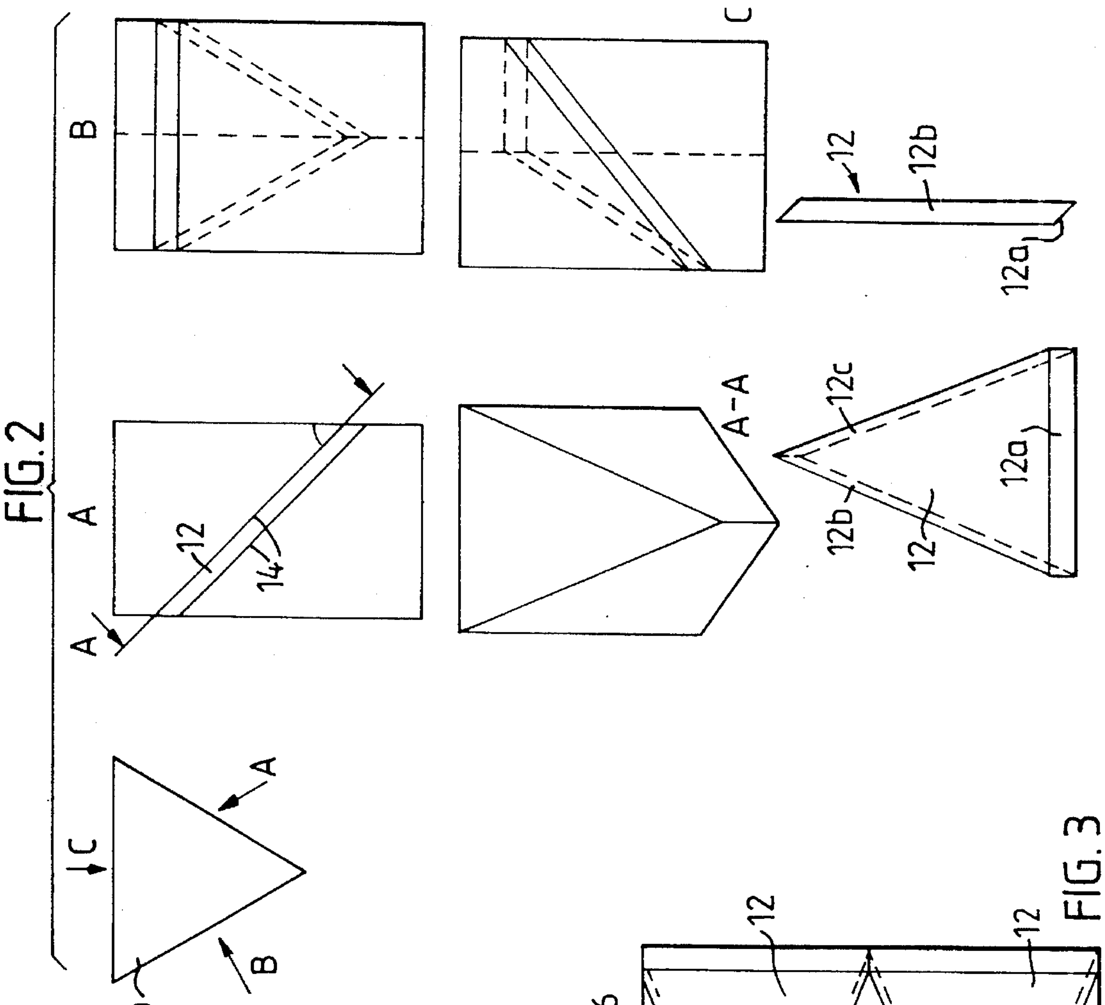
FIG. 2 shows different projections of the triangular piece of wood and of a plate of end-wood character cut therefrom.
Figure 3:
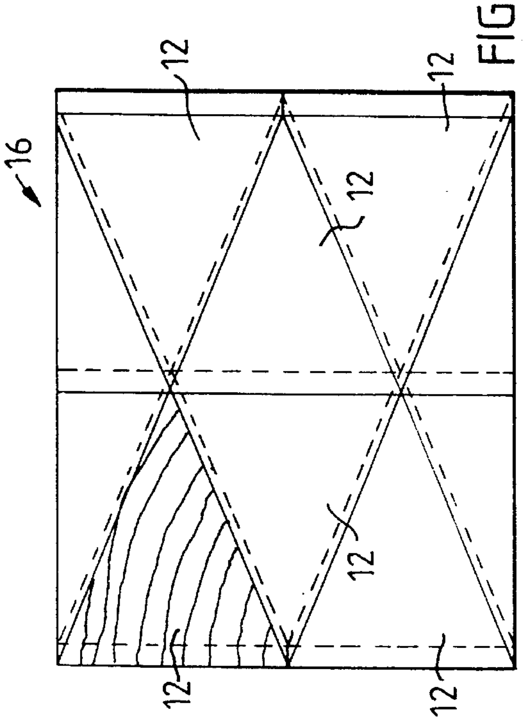
FIG. 3 is a plan view of a portion of a sheet element, composed of a plurality of obliquely cut angular plates of end-wood type, the sort shown at the bottom of FIG. 2.

As can be seen in FIGS. 1 and 2, plates 12 are sawn out of the piece of wood 10 with a cut section 14 oblique to the longitudinal direction, so that the plates 12 will have triangular shape with the same base 12*a* but with longer isosceles sides 12*b*,12*c* than the cross-section of the piece of wood 10. The obliquely cut plates 12 will be given, if cut out like this, oblique edge surfaces 12*a*, 12*b* and 12*c* and parallel plane surfaces, which will retain an appearance characteristic of end-wood. The obliquely cut-out plates 12 can then be laid together next to each other in the desired pattern, as is shown in FIG. 3, to form a sheet end-wood element 16 and the oblique side-surfaces 12*a*, 12*b* and 12*c* will form complementary enlarged joint surfaces which are glued together. The finished sheet element 16 can, if it is made of relatively thick plates 12, be used as a massive, self-supporting sheet, e.g. a table top, or be sawn up into plank or board form and possibly be provided with edge molding with tongue and groove to facilitate laying a massive end-wood floor. If the sheet element 16 is thinner, it can be used as a wear surface on ply floor-boards, and the wear layer is glued fast to the underlying support of e.g. plywood, particle board, core board or the like.

Figures 4, 5, 6:
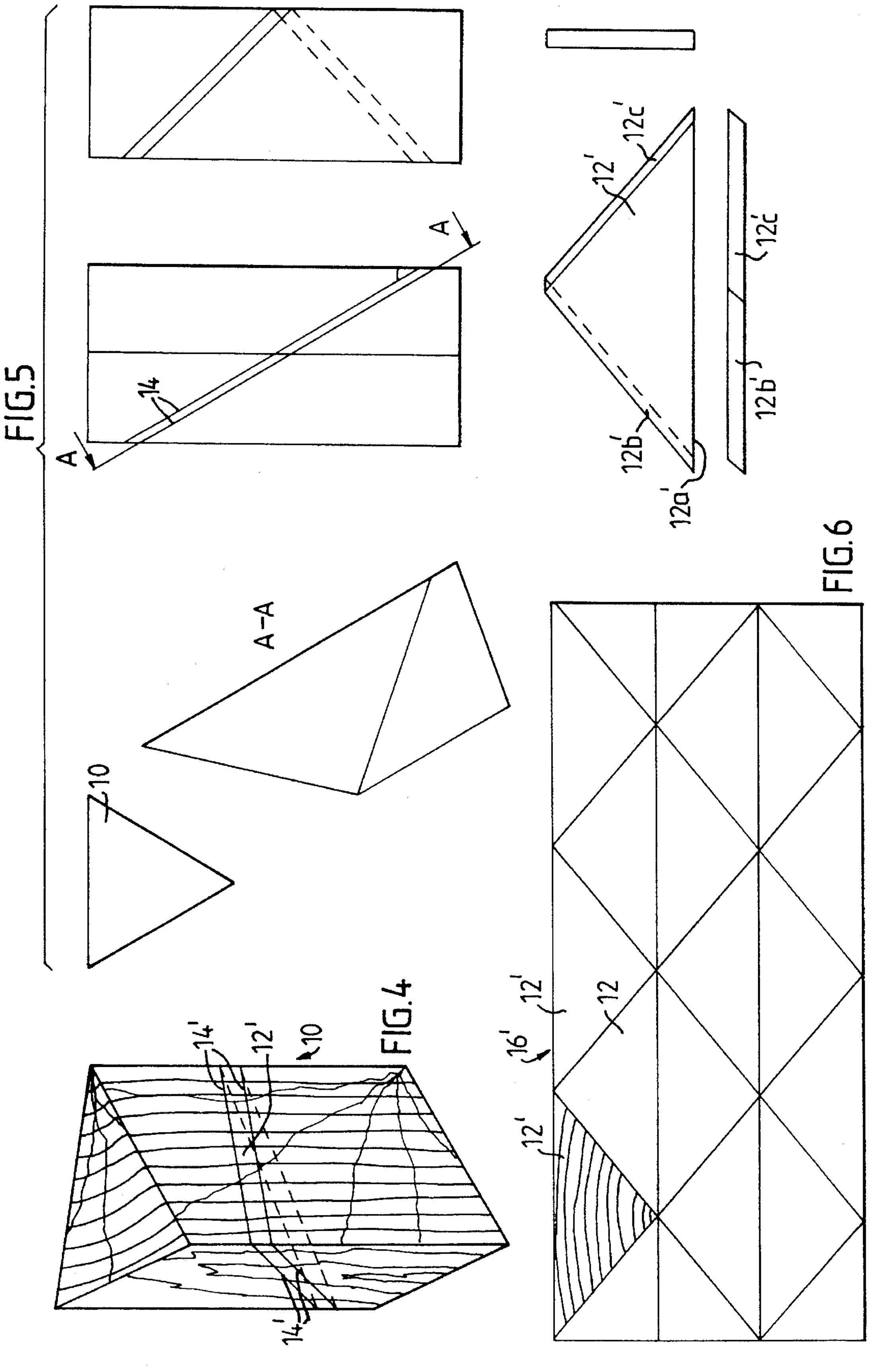
FIG. 4 shows a perspective view of a portion of a longitudinally sawn piece of wood, triangular in cross-section, with an indicated alternatively placed oblique saw cut therethrough.
FIG. 5 shows different projections of the piece of wood in FIG. 4 and the triangular plate of end-wood type cut therefrom.
FIG. 6 is a plan view of a portion of a sheet element, composed of a plurality of obliquely cut triangular plates of end-wood type of the sort shown at the bottom of FIG. 5.

FIGS. 4–6 show an alternative method of obliquely cutting out plates 12' from a triangularly longitudinally sawn piece of wood 10. In contrast to the embodiment shown in figures 1–3, the plates 12' are cut out with such an obliquely oriented cut 14' that plates 12' are obtained where both the base 12'*a* and its isosceles sides 12'*b*,12'*c* are substantially greater than the corresponding sides of the piece of wood 10. The edge surfaces 12'*b* and 12'*c* will thus be oblique, while the edge surface (the base) 12'*a* will be normal. Even here the parallel plane lateral surfaces of the plates will retain their end-wood character and can be laid next to each other and be glued together into a sheet end-wood element 16' in the manner shown in FIG. 6.

Common to the various oblique cuttings of the plates 12,12' is that they should be carried out within an angular range of about 30–75° to a plane perpendicular to the longitudinal axis of the piece of wood 10. This provides in most cases a suitable distribution of a dominant tangential moisture movement into an essentially small component in the plane of the wear surface and another component in a direction perpendicular to the plane of the wear surface. By suitable selection of this angle and orientation of the cutting plane in the piece of wood, it is possible to control the moisture movement for various types of wood so that it will be essentially of the same size in various directions in the plane of the wear surface, thus making it possible to substantially reduce the internal tensions in the wood, which otherwise could easily cause cracking in the final product.

I claim:

1. Method of manufacturing a sheet element of end-wood type for use as a wear surface for a floor, table or the like, comprising the steps of:

sawing a longitudinally sawn piece of wood with parallel cuts oblique to a longitudinal direction of said sawn piece of wood, into plates, a cut area of which is greater than a cross-sectional area of the piece of wood, whereafter laying the plates next to each other, and joining them together with complementarily shaped edge surfaces to form a sheet end-wood element.

2. Method according to claim 1, wherein the longitudinally sawn piece of wood is sawn up with oblique cuts within an angular range of about 30–75° to a plane normal to the longitudinal axis of the piece of wood.

3. Method according to claim 2, wherein the longitudinally sawn piece of wood is sawn at such an angle to a plane normal to the longitudinal axis of the piece of wood, whereby the sawn-out plates will have an essentially uniform movement of moisture in all directions in the surface plane of the plates.

4. Method according to claim 1, wherein the plates are joined together by gluing.

5. Method according to claim 1, wherein the plates are sawn relatively thick in order to form upon joining together a self-supporting, massive sheet of end-wood type, e.g., a table top.

6. Method according to claim 1, wherein the plates are sawn relatively thin to form a relatively thin wear layer of end-wood type for a laminated product, e.g. for gluing onto a supporting substrate, such as a particle board, plywood, core board or the like.

7. Method according to claim 1, wherein the edge surfaces of the sheet element are made perpendicular to the plane of the sheet element.

8. Method according to claim 1, wherein opposite edge surfaces of the sheet element are provided with complementary tongues and grooves.

9. Method according to claim 1, wherein the piece of wood is preferably of triangular or square cross-section.

10. Sheet element of end-wood type for use as a wear surface for floors, tables or the like, comprising:

obliquely sawn-out plates from longitudinally sawn pieces of wood, said plates being joined together with complementarily shaped edge surfaces to form the sheet end-wood element.

11. Sheet element according to claim 10, wherein the sheet element is made of relatively thick plates to form a self-supporting, massive sheet of end-wood type, e.g. a table top.

12. Sheet element according to claim 10, wherein the sheet element is made of relatively thin plates to form a relatively thin wear layer of end-wood type, which is glued onto a substrate, e.g. a particle board, plywood, core board or the like.

13. Plates for manufacturing a sheet element according to claim 10, wherein the plates are sawn out of a longitudinally sawn piece of wood of preferably triangular or square cross-section with parallel cuts oblique to the longitudinal direction.

* * * * *